(12) United States Patent
Garnier et al.

(10) Patent No.: US 11,655,735 B2
(45) Date of Patent: May 23, 2023

(54) ONBOARD SYSTEM AND A METHOD FOR DRAINING AN AEROENGINE

(71) Applicant: SAFRAN AIRCRAFT ENGINES, Paris (FR)

(72) Inventors: Alméric Pierre Louis Garnier, Moissy-Cramayel (FR); Josselin Xavier Coupard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 934 days.

(21) Appl. No.: 16/441,790

(22) Filed: Jun. 14, 2019

(65) Prior Publication Data
US 2019/0383175 A1 Dec. 19, 2019

(30) Foreign Application Priority Data
Jun. 14, 2018 (FR) ...................................... 1855225

(51) Int. Cl.
*F01D 25/32* (2006.01)
*F01D 25/18* (2006.01)
(Continued)

(52) U.S. Cl.
CPC ............ *F01D 25/32* (2013.01); *B64C 25/001* (2013.01); *B64D 33/00* (2013.01); *F01D 25/18* (2013.01);
(Continued)

(58) Field of Classification Search
CPC ......... F05D 2220/323; F05D 2260/602; F05D 2260/6022; F01D 25/32; F01D 9/065;
(Continued)

(56) References Cited

U.S. PATENT DOCUMENTS 2,438,245 A * 3/1948 Gregg ..................... F15B 1/26
  60/455
2,949,736 A  8/1960 Rubbra
(Continued)

FOREIGN PATENT DOCUMENTS

EP  2253805 A2  11/2010
EP  3184780 A1  6/2017
(Continued)

OTHER PUBLICATIONS

Official Communication dated Jun. 14, 2018, in corresponding FR Application No. 1855225 (7 pages).
(Continued)

*Primary Examiner* — Woody A Lee, Jr.
*Assistant Examiner* — Joshua R Beebe
(74) *Attorney, Agent, or Firm* — Bookoff McAndrews, PLLC

(57) ABSTRACT

An onboard system and a method for draining an aeroengine. The onboard system comprises a buffer tank having an admission passage for admitting under gravity fluid coming from the aeroengine, a primary tank situated above the buffer tank and having an emptying passage for emptying the fluid coming from the aeroengine, and a lift circuit connecting the buffer tank to the primary tank in order to transfer the fluid coming from the aeroengine from the buffer tank to the primary tank.

8 Claims, 3 Drawing Sheets

(51) Int. Cl.
  *B64D 33/00* (2006.01)
  *F02C 7/00* (2006.01)
  *B64C 25/00* (2006.01)

(52) U.S. Cl.
  CPC .......... *F02C 7/00* (2013.01); *F05D 2220/323* (2013.01); *F05D 2260/602* (2013.01)

(58) Field of Classification Search
  CPC ..... F02C 7/232; B64C 1/1453; B64C 25/001; B64D 37/20; B64D 33/00; F01M 11/04; F01M 11/0408; F01M 11/045
  See application file for complete search history.

(56) References Cited

U.S. PATENT DOCUMENTS

| | | | | | |
|---|---|---|---|---|---|
| 3,810,714 | A | * | 5/1974 | Turner | F02C 7/22 417/89 |
| 3,841,089 | A | * | 10/1974 | Clark | F02C 9/26 137/202 |
| 3,901,025 | A | * | 8/1975 | Bryerton | F02C 7/22 60/39.094 |
| 5,285,636 | A | * | 2/1994 | Mayo | B64D 1/16 244/129.1 |
| 5,289,900 | A | * | 3/1994 | Aho, Jr | F01M 11/04 137/577 |
| 6,343,465 | B1 | * | 2/2002 | Martinov | A62C 3/08 60/39.83 |
| 6,571,562 | B2 | * | 6/2003 | Wilcox | F16K 1/123 244/129.1 |
| 10,539,077 | B2 | * | 1/2020 | Py | B64D 45/00 |
| 2016/0312707 | A1 | | 10/2016 | Py et al. | |
| 2017/0002689 | A1 | * | 1/2017 | Leon | F01D 25/24 |
| 2017/0298792 | A1 | * | 10/2017 | Blais | F16N 31/00 |
| 2020/0025033 | A1 | * | 1/2020 | White | F01D 25/20 |

FOREIGN PATENT DOCUMENTS

| | | | | |
|---|---|---|---|---|
| EP | 3848568 A1 | * | 7/2021 | ............... F01D 25/20 |
| FR | 2780715 A1 | * | 1/2000 | ........... F01M 11/045 |
| WO | 2015/082833 A1 | | 6/2015 | |
| WO | WO 2015/082833 A1 | | 6/2015 | |

OTHER PUBLICATIONS

Search Report issued in corresponding application GB1908594.3 dated Nov. 21, 2019 (5 pages).

Examination Report issued in corresponding application GB 1908594.3 dated Mar. 25, 2022 (2 pages).

* cited by examiner

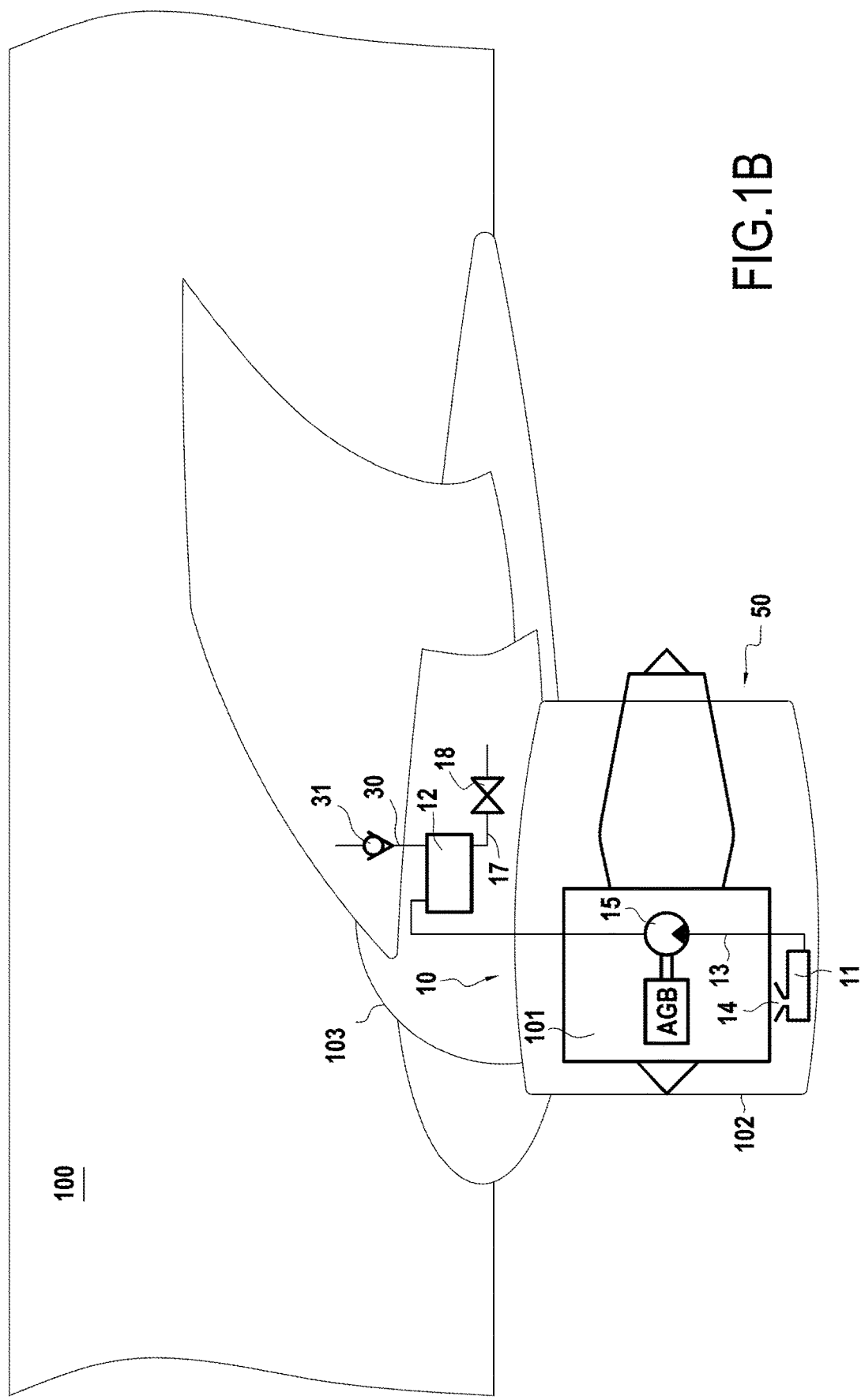

ONBOARD SYSTEM AND A METHOD FOR DRAINING AN AEROENGINE

CROSS-REFERENCE TO RELATED APPLICATION

This application claims priority to French Patent Application No. 1855225, filed on Jun. 14, 2018, the entirety of which is incorporated herein by reference.

BACKGROUND OF THE INVENTION

The present disclosure relates to the field of aircraft propulsion, and more particularly to a propulsion unit comprising an aeroengine together with an onboard system for draining the aeroengine.

In the present context, the term "aeroengine" is used to designate any thrust unit on board an aircraft for the purpose of propelling it in flight, and in particular gas turbine engines, such as for example single-flow or bypass turbojets, turboprops or turboshaft engines, but also piston engines, or electric motors.

Normally, aeroengines include moving parts that are subjected to high levels of mechanical and thermal stress. It is therefore generally important to feed certain elements of the motor with lubricating fluid, in particular its bearing for supporting rotary shafts. In addition, aeroengines may also include hydraulic actuators, which may in particular make use of the fuel as a hydraulic fluid and/or as a lubricant. A portion of the fluid can escape by vaporizing or by leaking liquid, thereby constituting a potential source of environmental pollution. Thus, in order to reduce or avoid such pollution, proposals have been made, in particular in published international patent application WO 2015/082833 A1, for onboard tanks for the purpose of receiving fluids drained from the engine, and for containing them until they are emptied in controlled manner.

Nevertheless, although it may be preferable to arrange such an onboard tank below the engine, so that fluid drains naturally towards the tank by gravity, such an arrangement can make the tank difficult to empty. Specifically, in particular with bypass turbojets, and given the gradual increase in their bypass ratios and thus in the diameter of their fans, the ground clearance of the engine can become very small, thus making it very awkward to access a tank situated below it. In addition, that position increases the risk of fire in the event of any impact against the bottom portions of the engine nacelles, in particular during a hard landing or during a wheel-up landing.

OBJECT AND SUMMARY OF THE INVENTION

The present disclosure seeks to remedy those drawbacks by proposing a propulsion unit comprising an aeroengine and an onboard system for draining the aeroengine, the system comprising a tank with an admission passage for admitting under gravity fluid coming from the aeroengine, while nevertheless enabling this fluid to be emptied more easily and minimizing fire risk.

In a first aspect, this object may be achieved by the fact that the tank including the gravity admission passage is a buffer tank situated below the aeroengine and the onboard system also has both a primary tank arranged above the buffer tank and including a passage for emptying the fluid coming from the aeroengine, and a lift circuit connecting the buffer tank to the primary tank in order to transfer the fluid coming from the aeroengine from the buffer tank to the primary tank.

Thus, emptying can be performed from the primary tank, which, as a result of the lift circuit, can be arranged in a position that is easier to access than the buffer tank.

In a second aspect, the lift circuit may include a pump, e.g. an electrically or mechanically driven pump, or a Venturi effect pump, arranged between the buffer tank and the primary tank.

Nevertheless, in a third aspect the onboard system may further comprise a pressurizing device for pressurizing the buffer tank in order to drive the fluid from the buffer tank to the primary tank via the lift circuit.

In a fourth aspect, the onboard system may further comprise a suction device connected to the primary tank in order to suck up the fluid from the buffer tank to the primary tank via the lift circuit. The suction device may in particular comprise a pneumatic chamber in suspension of a landing gear that is connected to the primary tank, e.g. via a check valve, in such a manner that expansion of the landing gear leads to suction towards the pneumatic chamber.

In a fifth aspect, the primary tank may be situated above the aeroengine, and in particular in a support pylon of the aeroengine.

In the context of the present disclosure, the terms "above" and "below" should be understood as referring to positions relative to a vertical axis when the aircraft is in its usual orientation in stable flight or on the ground. The primary tank being situated above the buffer tank should not be understood as meaning that it must necessarily be situated directly over the buffer tank, i.e. aligned therewith along the vertical axis: it is possible to envisage that, in projection onto a horizontal plane, it is offset at least in part relative to the buffer tank. The same applies to the relative positions of the aeroengine and the buffer tank and the primary tank.

A sixth aspect of the present disclosure provides method of draining an aeroengine, the method comprising a step of admitting fluid coming from the aeroengine into a buffer tank situated below the aeroengine, the fluid being admitted by gravity through a feed passage of the buffer tank, a step of transferring the fluid via a lift circuit from the buffer tank to a primary tank situated above the buffer tank, and a step of emptying the fluid via an emptying passage of the primary tank.

BRIEF DESCRIPTION OF THE DRAWINGS

The invention can be well understood and its advantages appear better on reading the following detailed description of embodiments given as non-limiting examples. The description refers to the accompanying drawings, in which:

FIG. 1B is a diagram showing a variant of the first embodiment;

DETAILED DESCRIPTION OF THE INVENTION

Figure 1A:
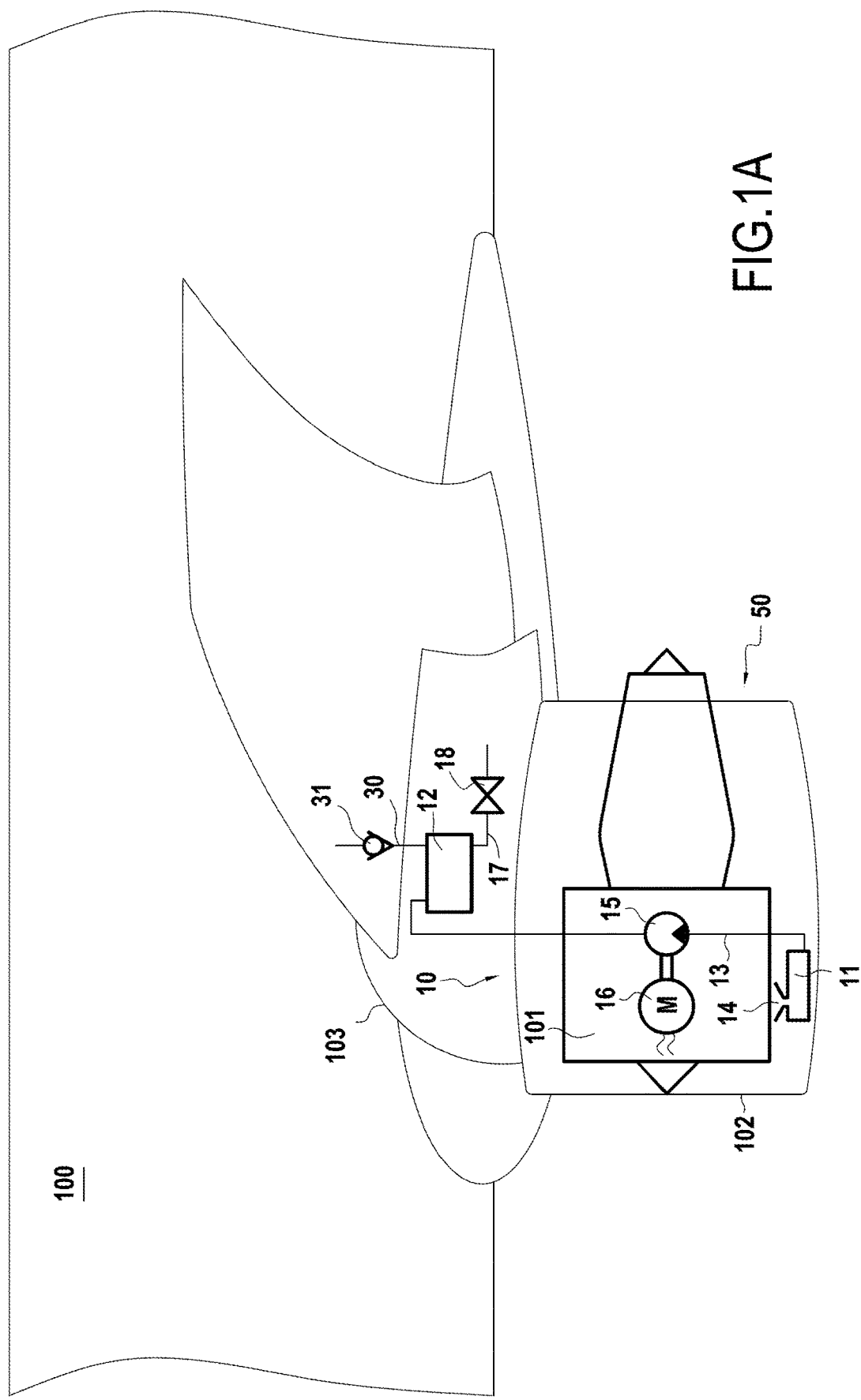
FIG. 1A is a diagram of an aircraft having an aeroengine fitted with an onboard drainage system in a first embodiment.

FIG. 1 shows an aircraft 100 with a propulsion unit 50 comprising an aeroengine 101 that may in particular be gas turbine engine, and more particularly a turbofan. As in the embodiment shown, this aeroengine 101 may be installed in a nacelle 102 and may be supported by a support pylon 103. As shown, the propulsion unit 50 may also include an onboard system 10 for draining fluids from the aeroengine 101, such as for example lubricant escaping from bearings for supporting rotary shafts of the aeroengine 101 and/or fuel escaping from the fuel feed circuit of the aeroengine 101 and/or from actuators using fuel as hydraulic fluid. Thus, the onboard system 10 may serve to avoid the fluid escaping to the outside of the aeroengine in uncontrolled manner, which would constitute a source of environmental pollution.

As shown in FIG. 1A, the onboard system 10 may comprise a buffer tank 11, a primary tank 12, and a lift circuit 13. The buffer tank 11 may in particular be situated below the aeroengine 101, in the nacelle 102 surrounding it, and may present at least one passage 14 for admitting under gravity fluid coming from the aeroengine 101. The primary tank 12 may be arranged above the buffer tank 11, and in particular above the aeroengine 101, e.g. in the support pylon 103, so as to be easy to access, in particular for emptying, and the lift circuit 13 may connect the buffer tank 11 to the primary tank 12 in order to transfer fluid coming from the aeroengine 101 from the buffer tank 11 to the primary tank 12.

To drive this transfer, and as in the example shown, the lift circuit 13 may comprise a pump 15 interposed between the buffer tank 11 and the primary tank 12. As shown in FIG. 1A, the pump 15 may be an electrically driven pump that is coupled to an electric motor 16 in order to be actuated.

The primary tank 12 may also present a ventilation passage 30, possibly fitted with a check valve 31, in order to enable air to escape from the primary tank 12 as its volume becomes progressively occupied by the fluid being delivered by the lift circuit 13. For emptying purposes, the primary tank 12 may present an emptying passage 17 with a valve 18 that can be closed and opened. Nevertheless other means for selectively closing and opening the emptying passage 17 can equally well be envisaged, such as for example a flap or merely a stopper.

Thus, in operation, the fluid drained from the engine 101, in particular in flight, can be admitted under gravity into the buffer tank 11 through its admission passage 14, so as subsequently to be transferred via the lift circuit 13 from the buffer tank 11 to the primary tank 12 under drive from the pump 15, which may itself be driven by the electric motor 16. The fluid as transferred in this way can thus be received in the primary tank 12, which is easier to access for possible emptying via the emptying passage 17 by opening the valve 18.

Although in the embodiment shown in FIG. 1A, the pump 15 is an electrically driven pump, other alternatives could be envisaged for driving it, e.g. a mechanical takeoff from a rotary shaft of the aeroengine 101, in particular via an aeroengine accessory gearbox (AGB) as in the onboard system 10 shown in FIG. 1B. The other elements in this variant are equivalent to those of FIG. 1A, they operate in analogous manner, and they are therefore given the same references.

Figure 2:
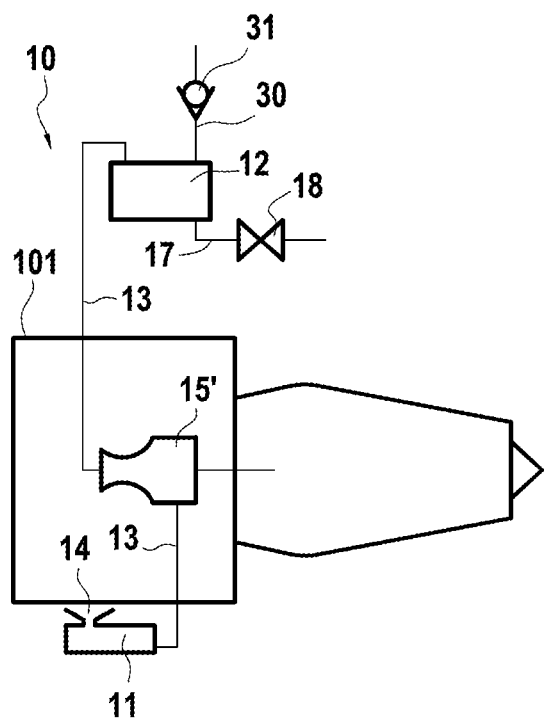
FIG. 2 is a diagram of an aircraft having an aeroengine fitted with an onboard drainage system in a second embodiment.

Other types of pump can also be envisaged for the pump included in the lift circuit between the buffer tank 11 and the primary tank 12. Thus, in the example shown in FIG. 2, the pump may be a Venturi effect pump 15' comprising an ejector connected to a source of pressurized fluid, such as for example a compressor of the aeroengine 101. The remaining elements of the embodiments shown in FIG. 2 are analogous to the elements of the embodiment of FIG. 1A, and they are therefore given the same references. In operation, ejecting pressurized fluid through the ejector of the pump 15' can thus serve to drive the transfer of the fluid that has been drained from the aeroengine 101 via the lift circuit 13 from the buffer tank 11 to the primary tank 12. The other steps of the draining method in this example may be analogous to those described above with reference to FIG. 1A.

Figure 3:
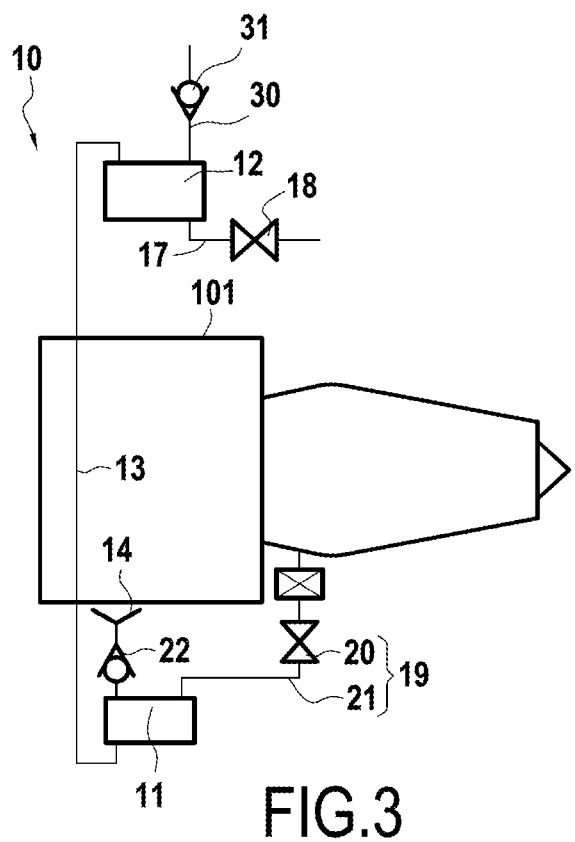
FIG. 3 is a diagram showing an aircraft having an aeroengine fitted with an onboard drainage system in a third embodiment.

Instead of including a pump between the buffer tank and the primary tank, it is also possible to envisage driving the transfer of fluid from the buffer tank to the primary tank by delivering pressure downstream and/or suction upstream. Thus, as shown in FIG. 3, the onboard system 10 may comprise, as an alternative or in addition to a pump included between the buffer tank 11 and the primary tank 12, a pressurizing device 19 for pressurizing the buffer tank 11 from time to time in order to transfer its contents via the lift circuit 13 to the primary tank 12. Like the ejector of the Venturi effect pump in FIG. 2, the pressurizing device 19 may be connected to a source of pressurized fluid, such as for example a compressor of the aeroengine 101. The pressurizing device 19 may also comprise a valve 20 to open and close a pressurizing duct 21 in order respectively to start and stop pressurizing the buffer tank 11. During this pressurization, in order to avoid the content of the buffer tank being returned through the admission passage 14 instead of being transferred to the primary tank 12 via the lift circuit 13, the admission passage 14 may include a check valve 22. The remaining elements of the embodiment shown in FIG. 3 are analogous to those of FIGS. 1A, 1B, and 2, and they are therefore given the same references.

Thus, in operation, when the valve 20 is opened, e.g. at regular intervals or when a level sensor (not shown) indicates that a threshold level has been reached in the buffer tank 11, the pressurizing device 19 can pressurize the buffer tank 11 by delivering the pressurized fluid thereto via the pressurizing duct 21. The extra pressure created in this manner inside the buffer tank 11 can close the check valve 22 so as to prevent the content of the buffer tank 11 being returned through the admission passage 14, and can drive the transfer of the fluid drained from the aeroengine 101 via the lift circuit 13 from the buffer tank 11 to the primary tank 12. The other steps of the draining method in this example may be analogous to those described above with reference to FIG. 1A.

Figure 4:
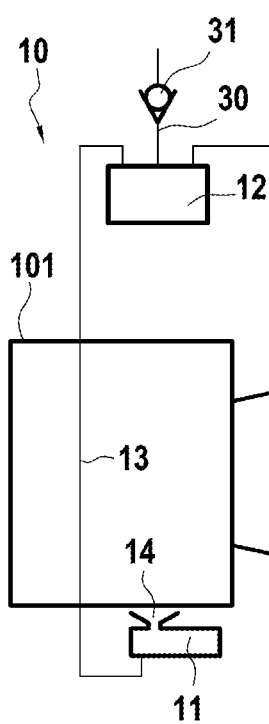
FIG. 4 is a diagram showing an aircraft having an aeroengine fitted with an onboard drainage system in a fourth embodiment.
Figure 4:
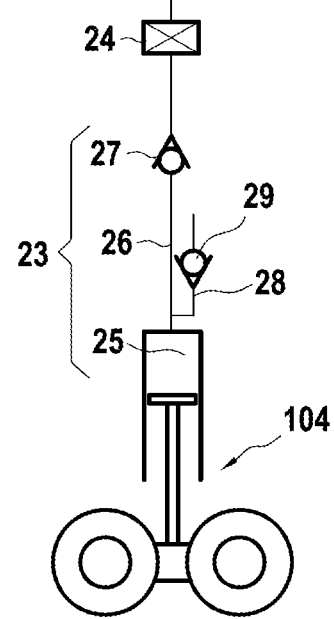

Finally, as shown in FIG. 4, the onboard system 10 may comprise, as an alternative or in addition to a pump included between the buffer tank 11 and the primary tank 12 and/or a pressurizing device 19 for pressurizing the buffer tank 11 from time to time, a suction device 23 for sucking the content from the buffer tank 11 via the lift circuit 13 to the primary tank 12. As shown, this suction device 23 may be connected to the primary tank 12 via a filter 24 so as to prevent any fluid drained from the aeroengine 101 and transferred from the buffer tank 11 via the lift circuit 13 being sucked beyond the primary tank 12. The suction device 23 may in particular comprise a pneumatic chamber 25 in the suspension of landing gear 104 of the aircraft 100, together with a duct 26 including a check valve 27 connecting the pneumatic chamber 25 to the filter 24. In order to enable air to escape from the pneumatic chamber 25, a branch 28 may be connected to the duct 26 between the pneumatic chamber 25 and the check valve 27, and it may be fitted with another check valve 29 oriented in the direction opposite to the check valve 27.

Thus, in operation, when the aircraft 100 is taxiing, any relaxation of its landing gear 104 can generate expansion in the pneumatic chamber 25, thereby giving rise to suction via the duct 26 with its check valve 27 and the filter 24 so as to suck up, via the lift circuit 13, the fluid drained from the aeroengine 101 and received in the buffer tank 11. In contrast, when the landing gear 104 is compressed, air can escape from the pneumatic chamber 25 via the branch connection 28 and its check valve 29. The other steps of the draining method in this example may be analogous to those described above with reference to FIG. 1A.

Although the present invention is described with reference to specific embodiments, it is clear that various modifications and changes may be undertaken on those embodiments without going beyond the general ambit of the invention as defined by the claims. In addition, individual features of the various embodiments described may be combined in additional embodiments. Consequently, the description and the drawings should be considered in a sense that is illustrative rather than restrictive.

The invention claimed is:

1. A propulsion unit comprising:
  an aeroengine; and
  an onboard system for draining the aeroengine, the onboard system comprising:
    a buffer tank situated below the aeroengine and including an admission passage for admitting fluid coming from the aeroengine under gravity;
    a primary tank situated above the buffer tank and including an emptying passage for emptying the fluid coming from the aeroengine; and
    a lift circuit connecting the buffer tank to the primary tank in order to transfer the fluid coming from the aeroengine from the buffer tank to the primary tank; and
    a suction device connected to the primary tank, wherein the suction device comprises a pneumatic chamber in a suspension of a landing gear that is connected to the primary tank.

2. The propulsion unit according to claim 1, wherein the lift circuit includes a pump between the buffer tank and the primary tank.

3. The propulsion unit according to claim 2, wherein the pump between the buffer tank and the primary tank is an electrically driven pump.

4. The propulsion unit according to claim 2, wherein the pump between the buffer tank and the primary tank is a Venturi effect pump.

5. The propulsion unit according to claim 1, further comprising a pressurizing device for pressurizing the buffer tank.

6. The propulsion unit according to claim 1, wherein the primary tank is situated above the aeroengine.

7. The propulsion unit according to claim 1, further comprising a pressurizing device connected to the aeroengine, wherein the pressurizing device comprises a valve and a pressurizing duct.

8. A method of draining an aeroengine, the method comprising:
  admitting fluid coming from the aeroengine into a buffer tank situated below the aeroengine, the fluid being admitted by gravity through a feed passage of the buffer tank;
  sucking the fluid via a lift circuit from the buffer tank to a primary tank situated above the buffer tank, using a suction device connected to the primary tank, wherein the suction device comprises a pneumatic chamber in a suspension of a landing gear that is connected to the primary tank; and
  emptying the fluid via an emptying passage of the primary tank.

* * * * *